United States Patent
Bray et al.

(10) Patent No.: US 10,169,592 B2
(45) Date of Patent: *Jan. 1, 2019

(54) SECURITY SYSTEMS GUI APPLICATION FRAMEWORK

(71) Applicant: International Business Machines Corporation, Armonk, NY (US)

(72) Inventors: Rory F. Bray, Rothesay (CA); Jason D. Keirstead, Fredericton (CA); Declan J. Wilson, Craigavon (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,521

(22) Filed: Oct. 13, 2015

(65) Prior Publication Data

US 2017/0103218 A1    Apr. 13, 2017

(51) Int. Cl.
| | | |
|---|---|---|
| *G06F 21/54* | (2013.01) | |
| *G06F 21/60* | (2013.01) | |
| *G06F 21/50* | (2013.01) | |
| *G06F 21/57* | (2013.01) | |

(52) U.S. Cl.
CPC ............ *G06F 21/604* (2013.01); *G06F 21/50* (2013.01); *G06F 21/57* (2013.01); *G06F 2221/034* (2013.01)

(58) Field of Classification Search
CPC combination set(s) only.
See application file for complete search history.

(56) References Cited

U.S. PATENT DOCUMENTS

| | | | |
|---|---|---|---|
| 7,703,073 B2 | 4/2010 | Illowsky et al. | |
| 9,047,577 B2 | 6/2015 | Deng et al. | |
| 9,049,186 B1 | 6/2015 | Paczkowski et al. | |
| 9,684,673 B2 | 6/2017 | Beckett et al. | |
| 9,825,735 B2 | 11/2017 | Lu et al. | |
| 2002/0198971 A1 | 12/2002 | Resnick et al. | |
| 2005/0114771 A1 | 5/2005 | Piehler et al. | |
| 2006/0085412 A1* | 4/2006 | Johnson | G06F 17/30566 |
| 2006/0085754 A1 | 4/2006 | Li et al. | |
| 2007/0101297 A1* | 5/2007 | Forstall | G06F 3/04817 715/841 |
| 2008/0168382 A1* | 7/2008 | Louch | G06F 3/0488 715/781 |
| 2009/0276771 A1 | 11/2009 | Nickolov et al. | |
| 2013/0046894 A1* | 2/2013 | Said | G06F 9/547 709/226 |
| 2013/0191404 A1 | 7/2013 | Holmes et al. | |
| 2013/0246944 A1 | 9/2013 | Pandiyan et al. | |
| 2013/0282884 A1* | 10/2013 | Chandrasekaran | H04L 49/70 709/223 |

(Continued)

*Primary Examiner* — Phy Anh Vu
(74) *Attorney, Agent, or Firm* — Terrile, Cannatti & Chambers, LLP; Stephen A. Terrile

(57) ABSTRACT

A method, system and computer-usable medium are disclosed for injecting functionality into a security intelligence platform, comprising: providing the security intelligence platform with a plurality of backend endpoints; generating a modification to the security intelligence platform according to an application framework, the modification comprising metadata associated with functionality, the metadata corresponding to a predefined format; and, merging the modification with the security intelligence platform via a secure container system container.

14 Claims, 3 Drawing Sheets

(56) References Cited

U.S. PATENT DOCUMENTS

| | | | |
|---|---|---|---|
| 2014/0215303 A1* | 7/2014 | Grigorovitch | G06F 17/212 |
| | | | 715/229 |
| 2015/0052496 A1* | 2/2015 | Helms | G06F 8/34 |
| | | | 717/109 |
| 2015/0095333 A1 | 4/2015 | Porpora et al. | |
| 2015/0310188 A1* | 10/2015 | Ford | G06F 21/10 |
| | | | 726/28 |
| 2015/0312211 A1* | 10/2015 | Beauchesne | H04L 61/15 |
| | | | 709/238 |
| 2016/0171107 A1 | 6/2016 | Erickson et al. | |

* cited by examiner

SECURITY SYSTEMS GUI APPLICATION FRAMEWORK

BACKGROUND OF THE INVENTION

Field of the Invention

The present invention relates in general to the field of computers and similar technologies, and in particular to software utilized in this field. Still more particularly, it relates to a method, system and computer-usable medium for providing security systems with a graphical user interface application framework.

Description of the Related Art

Organizations today are exposed to a greater volume and variety of attacks than in the past. Advanced attackers are clever and patient, leaving just a whisper of their presence. Accordingly, it is desirable to provide security functionality which helps to detect and defend against threats by applying sophisticated analytics to more types of data. It is also desirable to provide such security functionality which identifies high-priority incidents that might otherwise get lost in the noise of the overall operation of a large scale information processing environment.

It is known to provide security functionality to IT environments via security intelligence platforms which integrate security information and event management (SIEM), log management, anomaly detection, vulnerability management, risk management and incident forensics into a unified solution.

Many known security intelligence platforms generate a limited number of update releases per year. Customers wishing to include any new functionality or user interface changes often must wait for these releases and request that any desired new functionality or user interface changes to be included within the next release.

SUMMARY OF THE INVENTION

A method, system and computer-usable medium are disclosed for injecting functionality into a security intelligence platform, comprising: providing the security intelligence platform with a plurality of backend endpoints; generating a modification to the security intelligence platform according to an application framework, the modification comprising metadata associated with functionality, the metadata corresponding to a predefined format; and, merging the modification with the security intelligence platform via a secure container system container.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
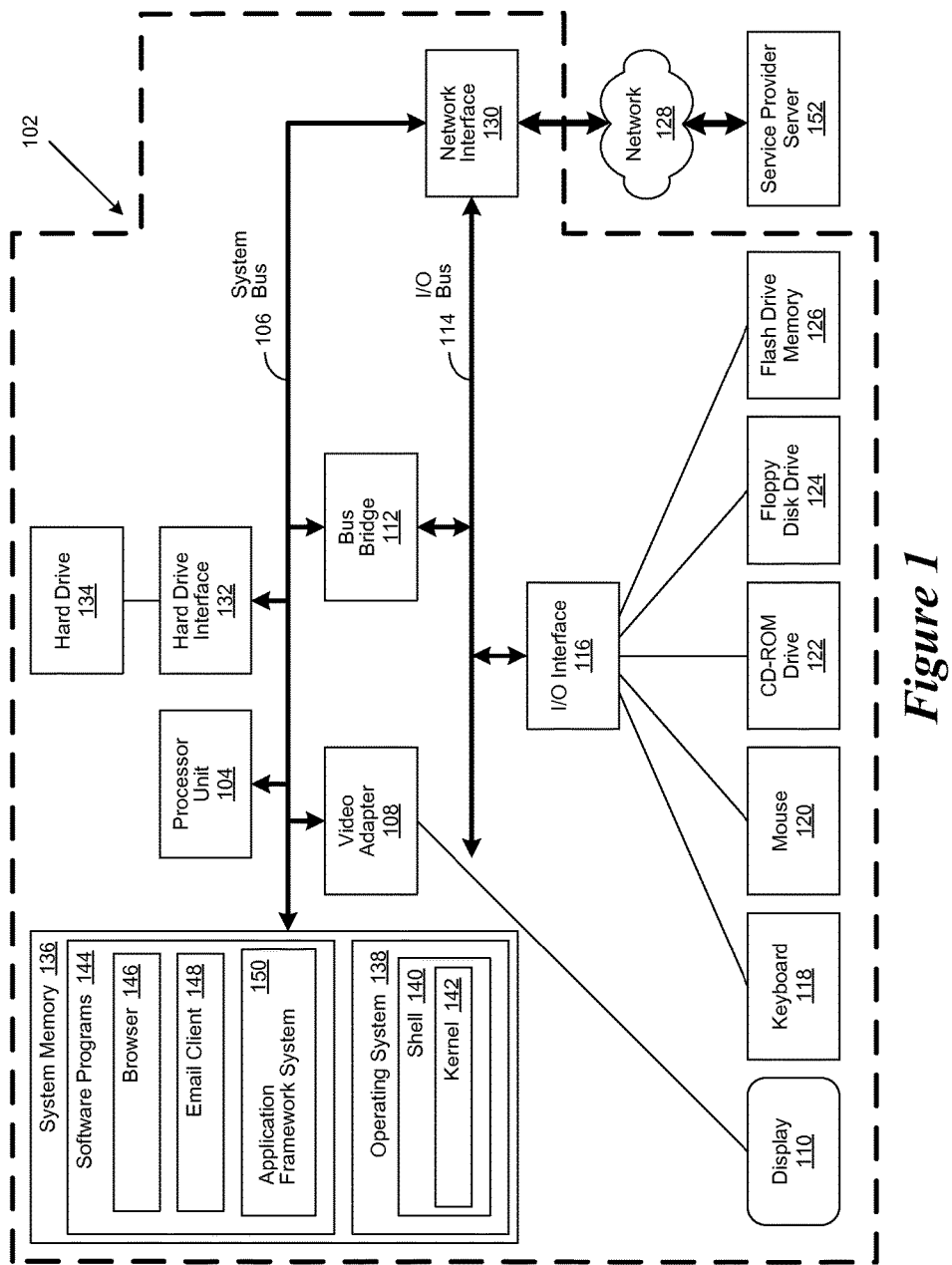
FIG. 1 depicts an exemplary client computer in which the present invention may be implemented.

A method, system and computer-usable medium are disclosed for providing security systems with a graphical user interface application framework. The application framework includes a plurality of security platform backend endpoints, for allowing customers to merge bespoke customer specific GUI functionality dynamically into an existing security intelligence platform interface. In certain embodiments, the user interface application framework is served from a secure container outside of the bounds of the security intelligence platform.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include an application framework system 150. In these and other embodiments, the application framework system 150 includes code for implementing the processes described hereinbelow. In one embodiment, client computer 102 is able to download the application framework system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
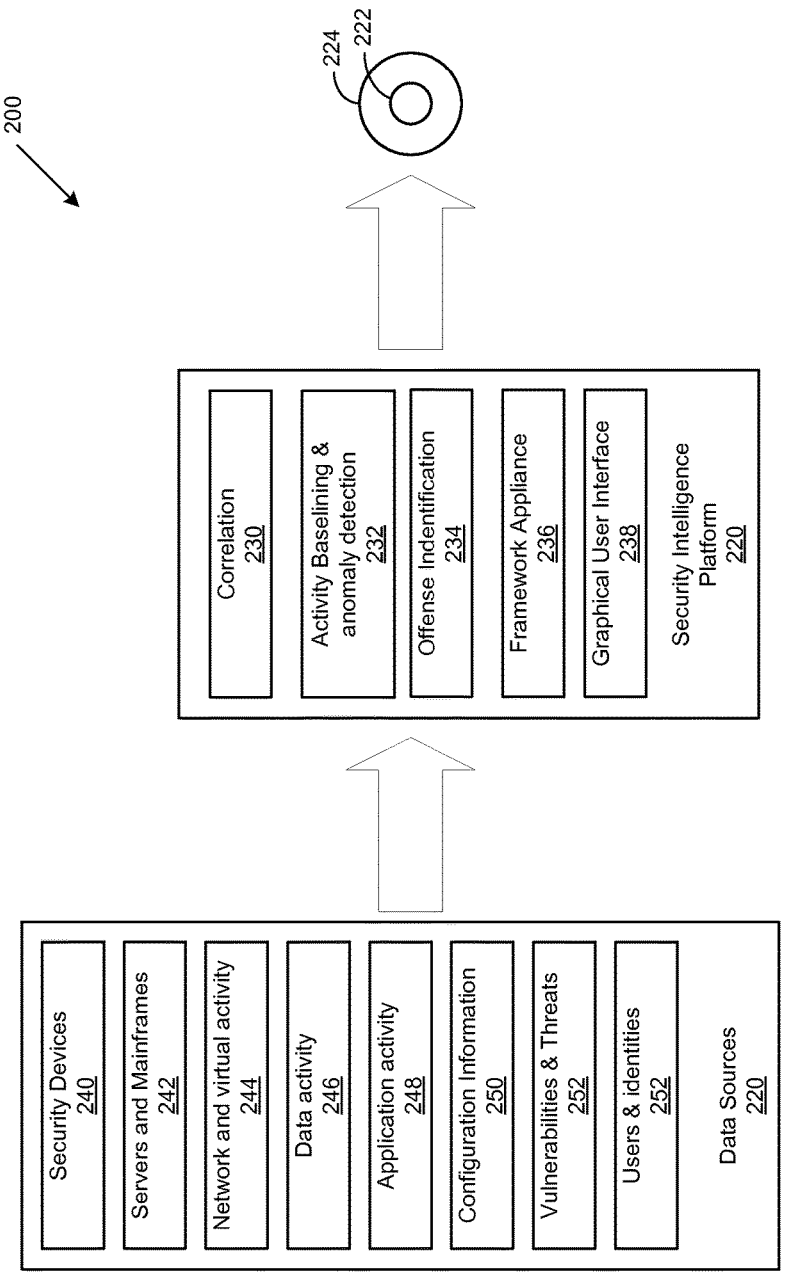
FIG. 2 is a simplified block diagram of a security intelligence platform.

FIG. 2 shows a simplified block diagram of a security intelligence environment 200 which includes a security intelligence platform 210 in accordance with various aspects of the invention. The security intelligence platform 210 integrates security information and event management (SIEM), log management, anomaly detection, vulnerability management, risk management and incident forensics into a unified solution. By using intelligence, integration and automation to provide 360-degree security insight, the security intelligence platform 210 delivers threat detection, ease of use and lower total cost of ownership. The security intelligence platform 210 uses intelligence, integration and automation to deliver security and compliance functionality.

The security intelligence platform 210 receives information from one or more of a plurality of data sources 220 and performs one or more of correlation operations, activity baselining and anomaly detection operations and offense identification operations to provide an identification of a true offense 222 as well as identification of suspected intendents 224. In certain embodiments, the security intelligence platform 210 includes one or more of an integrated family of modules that can help detect threats that otherwise would be missed. For example, in certain embodiments, the family of modules can include a correlation module 230 for performing the correlation operations, an activity baselining and anomaly detection module 232 for performing the activity baselining and anomaly detection operations, and an offence identification module 234 for performing the offence identification operation. In various embodiments, the correlation operation includes one or more of logs/events analysis, flow analysis, IP reputation analysis and geographic location analysis. In various embodiments, the activity baselining and anomaly detection operation includes one or more of user activity analysis, database activity analysis, application activity analysis and network activity analysis. In various embodiments, the offense identification operation includes one or more of credibility analysis, severity analysis and relevance analysis.

The security intelligence platform 200 also includes an application framework appliance 236 as well as a security intelligence graphical user interface 238. The application framework appliance 236 allows customers to inject content and functionality into the security intelligence platform 200 such as into the graphical user interface 238. Customers don't need to have any knowledge about the source end points to inject the content and functionality. Such an application framework appliance avoids having customers cycle with developer to have functionality integrated into the application.

The plurality of data sources 220 can include one or more of security devices 240, servers and mainframes 242, network and virtual activity data sources 244, data activity data sources 246, application activity data sources 248, configuration information data sources 250, vulnerabilities and threats information data sources 252 as well as users and identities data sources 254.

The security intelligence platform 210 helps detect and defend against threats by applying sophisticated analytics to the data received from the plurality of data sources. In doing so, the security intelligence platform 210 helps identify high-priority incidents that might otherwise get lost in the noise of the operation of a large scale information processing environment. The security intelligence platform 200 uses some or all of the integrated family of modules to solve a number of business issues including: consolidating data silos into one integrated solution; identifying insider theft and fraud; managing vulnerabilities, configurations, compliance and risks; conducting forensic investigations of incidents and offenses; and, addressing regulatory mandates.

In various embodiments, the security intelligence platform 210 provides a plurality of functions. For example, in certain embodiments, the security intelligence platforms consolidates data silos from a plurality of data sources. More specifically, while a wealth of information exists within organizations operating large scale information processing systems such as log, network flow and business process data, this information is often held in discrete data silos. The security intelligence platform 210 converges network, security and operations views into a unified and flexible solution. The security intelligence platform breaks down the walls between silos by correlating logs with network flows and a multitude of other data, presenting virtually all relevant information on a single screen. Such a correlation helps enable superior threat detection and a much richer view of enterprise activity.

Additionally, in various embodiments, the security intelligence platform performs an insider fraud detection operation. Some of the gravest threats to an organization can come from the inside the organization, yet organizations often lack the intelligence needed to detect malicious insiders or outside parties that have compromised user accounts. By combining user and application monitoring with application-layer network visibility, organizations can better detect meaningful deviations from normal activity, helping to stop an attack before it completes.

Additionally, in various embodiments, the security intelligence platform 210 predicts and remediates risk and vulnerabilities. Security, network and infrastructure teams strive to manage risk by identifying vulnerabilities and prioritizing remediation before a breach occurs. The security intelligence platform 210 integrates risk, configuration and vulnerability management with SIEM capabilities, including correlation and network flow analytics, to help provide better insight into critical vulnerabilities. As a result, organizations can remediate risks more effectively and efficiently.

Additionally, in various embodiments, the security intelligence platform 210 can conduct forensics analysis. In certain embodiments, the security intelligence platform 210 includes integrated incident forensics helps IT security teams reduce the time spent investigating security incidents, and eliminates the need for specialized training The security intelligence platform 210 expands security data searches to include full packet captures and digitally stored text, voice, and image documents. The security intelligence platform helps present clarity around what happened when, who was involved, and what data was accessed or transferred in a security incident. As a result, the security intelligence platform 210 helps remediate a network breach and can help prevent it from succeeding again.

Additionally, in various embodiments, the security intelligence platform 210 addresses regulatory compliance mandates. Many organizations wrestle with passing compliance audits while having to perform data collection, monitoring and reporting with increasingly limited resources. To automate and simplify compliance tasks, the security intelligence platform 210 provides collection, correlation and reporting on compliance-related activity, backed by numerous out-of-the-box report templates.

The security intelligence platform 210 leverages easier-to-use security analytics. More specifically, the security intelligence platform 210 provides a unified architecture for storing, correlating, querying and reporting on log, flow, vulnerability, and malevolent user and asset data. The security intelligence platform 210 combines sophisticated analytics with out-of-the-box rules, reports and dashboards. While the platform is powerful and scalable for large corporations and major government agencies, the platform is also intuitive and flexible enough for small and midsize organizations. Users benefit from potentially faster time to value, lower cost of ownership, greater agility, and enhanced protection against security and compliance risks.

The security intelligence platform 210 provides advanced intelligence. More specifically, by analyzing more types of data and using more analytics techniques, the platform can often detect threats that might be missed by other solutions and help provide advanced network visibility.

The security intelligence platform 210 also provides advanced integration. Because the security intelligence platform includes a common application platform, database and user interface, the platform delivers massive log management scale without compromising the real-time intelligence of SIEM and network behavior analytics. It provides a common solution for all searching, correlation, anomaly detection and reporting functions. A single, intuitive user interface provides seamless access to all log management, flow analysis, incident management, configuration management, risk and vulnerability management, incident forensics, dashboard and reporting functions.

The security intelligence platform 210 also provides advanced automation. More specifically, the security intelligence platform 201 is simple to deploy and manage, offering extensive out-of-the-box integration modules and security intelligence content. By automating many asset discovery, data normalization and tuning functions, while providing out-of-the-box rules and reports, the security intelligence platform 210 is designed to reduce complexity of the operation of the platform.

Figure 3:
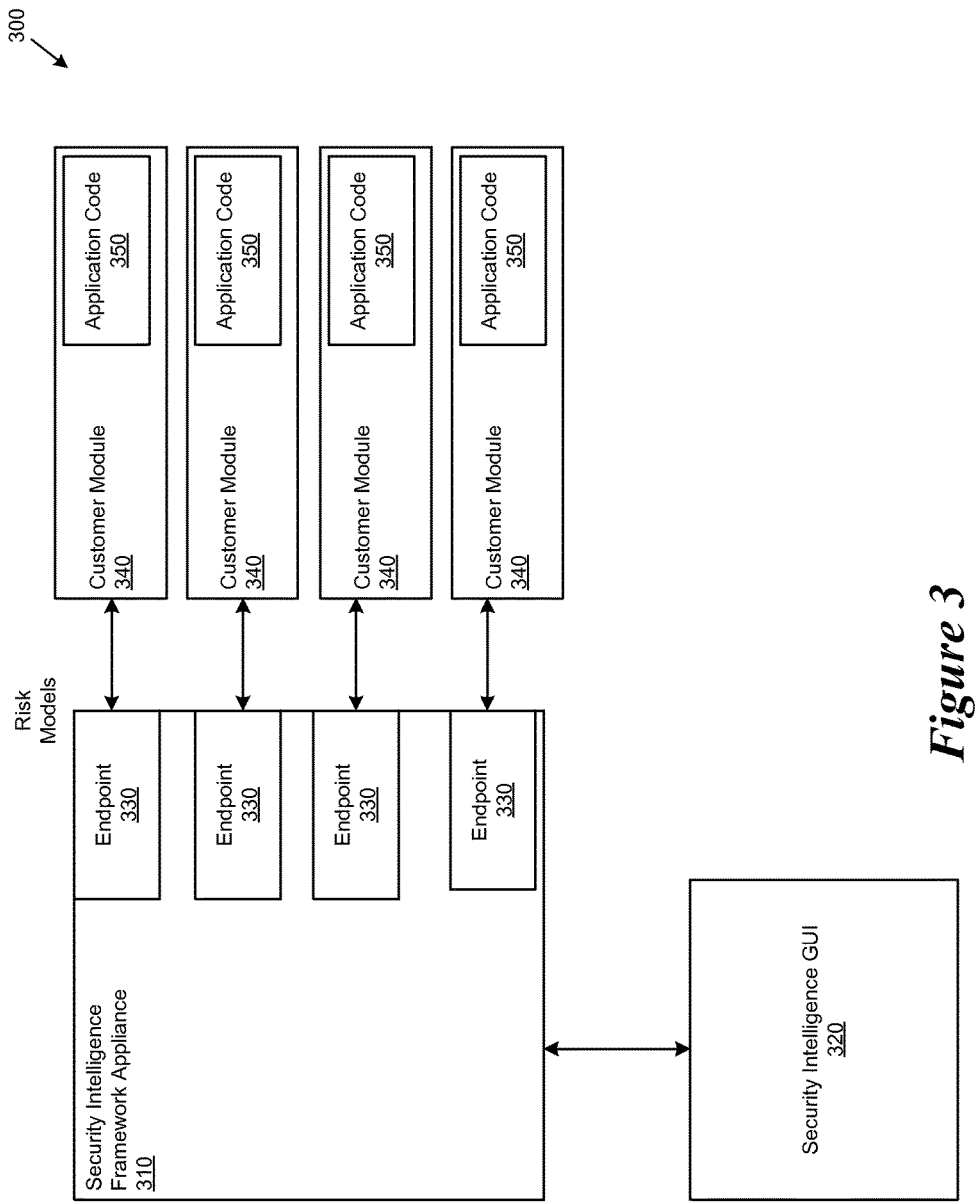
FIG. 3 is a block diagram of the security intelligence application appliance framework.

Referring to FIG. 3, a block diagram of the security intelligence application appliance framework 300 is shown. More specifically, the security intelligence application framework 300 includes a security intelligence framework appliance 310, a security intelligence graphical user interface 320. The security intelligence framework appliance 310 includes a plurality of security platform backend endpoints 330 which allow a plurality of customers to merge customer specific GUI functionality dynamically into the security intelligence platform graphical user interface 320.

In certain embodiments, the user interface application framework is served from a secure container outside of the bounds of the security intelligence platform.

The security intelligence application framework 300 includes respective customer modules 340 which provide well defined metadata descriptions via which the each customer can provide respective functionality dynamically to the security intelligence platform 300. The customer can use any language choice, the revisions merely need to be packaged according to a predefined format for the metadata descriptions. There is no need for the customer to have any knowledge of the core development platforms of the security intelligence platform. The application framework 300 enables applications to be completely agnostic to any existing security system codebase. The application framework 300 receives the packaged metadata descriptor alongside the custom application code 350 and seamlessly integrates the application functionality and output back into existing interface points.

More specifically, in various embodiments, the security platform backend endpoints 330 comprise one or more of a visualization interface point, a right click menu interface point, a toolbar buttons interface point, a dashboard/dashboard widget interface point, an administrative screens interface point, a hover over metadata endpoint, a javascript page scripts interface point and a resource bundles interface point. The visualization interface point enables new screens to be presented in a new tab, with the content served from the confines of the application code 350 running securely within the confines of a customer module 350. The right click menu interface point enables new right click menu options to be available with the user interface of the security intelligence platform. The right click menu interface point includes the enabling code executing from the confines of the application code 350 running securely within the confines of a customer module 340. The toolbar buttons interface point enables new toolbar buttons to be available to the user interface of the security intelligence platform. The toolbar buttons interface points includes the enabling code executing from the confines of the application code 350 running securely within the confines of a customer module 340. The dashboard/dashboard widget interface point enables new dashboard widgets to be added to the user interface of the security intelligence platform. The dashboard/dashboard widget interface point includes content served from the confines of the application code 340 running securely within the confines of a customer module 34. The administrative screens interface point enables new Admin tabs, configuration and setup screens to be added to the user interface of the security intelligence platform. The administrative screens interface point includes content served from the confines of the Application Code 350 running securely within the confines of a customer module 340. The hover over metadata endpoint enables injection of hover over additional metadata functionality to be incorporated into existing hover over areas. The hover over metadata endpoint includes content served from the confines of the application code 350 running securely within the confines of a customer module 340. The javascript page scripts interface point enables injected browser Javascript functionality specific to a particular existing user interface screen area of the security intelligence platform. The javascript page scripts interface point dynamically links the Javascript from the confines of the application code 340 running securely within the confines of a customer module 340. The resource bundles interface point provides partial support of Java-esque key value pair G11n properties (i.e., a combination of globalization and localization properties). The resource bundles interface point dynamically loads resource bundles from the confines of the Application Code 350 running securely within the confines of a customer module 340.

In certain embodiments, the application framework corresponds to a representational state transfer (REST) software architecture and communication with the security intelligence framework appliance 310 is via RESTful callbacks. More specifically, the framework is configured as a client server architecture where there is a uniform interface separating the server (e.g., the security system) and the clients (e.g., the customer applications). Additionally, the communication is configured to be stateless such that there is no customer context stored on the security system between customer requests. Additionally, the communications between the security system and the customer are cacheable to prevent the customers from reusing state data in response to a further communication. Additionally, the communications between the security system and the customer are via a uniform interface. The uniform interface includes an identification of resources, enables manipulation of the resources via the representations, includes a self descriptive message and includes a hypermedia as an engine of the application state.

In certain embodiments, the security appliance may be managed within the platform provider. Alternately, in certain embodiments, the security appliance may be configured to execute remote to the platform provider. When executing, the appliance may execute within a secure container system instance. In certain embodiments, the secure container system comprises an instance of a Linux container stack. In certain embodiments, the secure container system instance includes an application program interface (API) to provide lightweight containers that can execute the various customer applications in isolation. In certain embodiments, the secure container system is implemented as a Docker instance.

Although the present invention has been described in detail, it should be understood that various changes, substitutions and alterations can be made hereto without departing from the spirit and scope of the invention as defined by the appended claims.

What is claimed is:

1. A system comprising:
   a hardware processor;
   a data bus coupled to the hardware processor; and
   a computer-usable medium embodying computer program code, the computer-usable medium being coupled to the data bus, the computer program code used for injecting functionality into a security intelligence platform and comprising instructions executable by the hardware processor and configured for:
   providing the security intelligence platform with a plurality of backend endpoints, each of the plurality of backend endpoints comprising:
      a visualization interface point, the visualization interface point enabling new screens to be presented in a new tab with content served from application code running securely within a customer module;
      a right click menu interface point, the right click menu interface point enabling new right click menu options to be available within a user interface of the security intelligence platform, the right click menu interface point enabling the application code running securely within the customer module;

a toolbar buttons interface point, the toolbar buttons interface point enabling new toolbar buttons to be available to the user interface of the security intelligence platform, the toolbar buttons interface point enabling the application code running securely within the customer module;

a dashboard interface point, the dashboard interface point enabling new dashboard widgets to be added to the user interface of the security intelligence platform, the dashboard interface point enabling the application code running securely within the customer module;

an administrative screens interface point, the administrative screens interface point enabling new administrative tabs, configuration screens and setup screens to be added to the user interface of the security intelligence platform, the administrative screens interface point enabling the application code running securely within the customer module;

a hover over metadata endpoint, the hover over metadata endpoint enabling injection of hover over additional metadata functionality to be incorporated into existing hover over areas of the user interface of the security intelligence platform, the hover over metadata endpoint running securely within the customer module;

a Javascript page scripts interface point, the Javascript page scripts interface point enabling injected browser Javascript specific to a particular existing user interface of the security intelligence platform, the Javascript page scripts interface point dynamically linking Javascript from the application code running securely within the customer model module; and a resource bundles interface point, the resource bundles interface point providing support for globalization and localization key value properties, the resource bundles interface point dynamically loading resource bundles from the application code running securely within the customer model module;

generating a modification to the security intelligence platform according to an application framework, the modification comprising metadata associated with its functionality, the metadata corresponding to a predefined format; and, merging the modification with the security intelligence platform via a secure system container and an endpoint of the plurality of backend endpoints.

2. The system of claim 1, wherein:
the secure system container is located within a secure container system stack.

3. The system of claim 1, wherein:
the application framework comprises respective customer modules, each respective customer module providing well defined metadata descriptions via which a customer can provide functionality dynamically to the security intelligence platform.

4. The system of claim 1, wherein:
the application framework receives a packaged metadata descriptor alongside custom application code and seamlessly integrates corresponding functionality and output back into existing interface points of the security intelligence platform.

5. The system of claim 1, wherein:
the application framework corresponds to a representational state transfer (REST) software architecture.

6. The system of claim 5, wherein:
the application framework communicates with a security intelligence framework appliance via RESTful callbacks.

7. A non-transitory, computer-readable storage medium embodying computer program code, the computer program code comprising computer executable instructions configured for:

providing the security intelligence platform with a plurality of backend endpoints, each of the plurality of backend endpoints comprising:

a visualization interface point, the visualization interface point enabling new screens to be presented in a new tab with content served from application code running securely within a customer module;

a right click menu interface point, the right click menu interface point enabling new right click menu options to be available within a user interface of the security intelligence platform, the right click menu interface point enabling the application code running securely within the customer module;

a toolbar buttons interface point, the toolbar buttons interface point enabling new toolbar buttons to be available to the user interface of the security intelligence platform, the toolbar buttons interface point enabling the application code running securely within the customer module;

a dashboard interface point, the dashboard interface point enabling new dashboard widgets to be added to the user interface of the security intelligence platform, the dashboard interface point enabling the application code running securely within the customer module;

an administrative screens interface point, the administrative screens interface point enabling new administrative tabs, configuration screens and setup screens to be added to the user interface of the security intelligence platform, the administrative screens interface point enabling the application code running securely within the customer module;

a hover over metadata endpoint, the hover over metadata endpoint enabling injection of hover over additional metadata functionality to be incorporated into existing hover over areas of the user interface of the security intelligence platform, the hover over metadata endpoint running securely within the customer module;

a Javascript page scripts interface point, the Javascript page scripts interface point enabling injected browser Javascript specific to a particular existing user interface of the security intelligence platform, the Javascript page scripts interface point dynamically linking Javascript from the application code running securely within the customer model module; and a resource bundles interface point, the resource bundles interface point providing support for globalization and localization key value properties, the resource bundles interface point dynamically loading resource bundles from the application code running securely within the customer model module;

generating a modification to the security intelligence platform according to an application framework, the modification comprising metadata associated with its functionality, the metadata corresponding to a predefined format; and, merging the modification with the security intelligence platform via a secure system container and an endpoint of the plurality of backend endpoints.

8. The non-transitory, computer-readable storage medium of claim 7, wherein:
the secure system container is located within a secure container system stack.

9. The non-transitory, computer-readable storage medium of claim 7, wherein:
the application framework comprises respective customer modules, each respective customer module providing well defined metadata descriptions via which a customer can provide functionality dynamically to the security intelligence platform.

10. The non-transitory, computer-readable storage medium of claim 7, wherein:
the application framework receives a packaged metadata descriptor alongside custom application code and seamlessly integrates corresponding functionality and output back into existing interface points of the security intelligence platform.

11. The non-transitory, computer-readable storage medium of claim 7, wherein:
the application framework corresponds to a representational state transfer (REST) software architecture.

12. The non-transitory, computer-readable storage medium of claim 11, wherein:
the application framework communicates with a security intelligence framework appliance via RESTful callbacks.

13. The non-transitory, computer-readable storage medium of claim 7, wherein the computer executable instructions are deployed to a client system from a server system at a remote location.

14. The non-transitory, computer-readable storage medium of claim 7, wherein the computer executable instructions are provided by a service provider to a user on an on-demand basis.

* * * * *